United States Patent [19]
Hara et al.

[11] 4,303,442
[45] * Dec. 1, 1981

[54] DIAMOND SINTERED BODY AND THE METHOD FOR PRODUCING THE SAME

[75] Inventors: Akio Hara; Shuji Yazu, both of Itami, Japan

[73] Assignee: Sumitomo Electric Industries, Ltd., Osaka, Japan

[*] Notice: The portion of the term of this patent subsequent to Oct. 23, 1996, has been disclaimed.

[21] Appl. No.: 69,575

[22] Filed: Aug. 24, 1979

[30] Foreign Application Priority Data

Aug. 26, 1978 [JP] Japan ................................ 53-104016
Sep. 27, 1978 [JP] Japan ................................ 53-119685
Nov. 17, 1978 [JP] Japan ................................ 53-142657

[51] Int. Cl.$^3$ ............................................. B22F 00/00
[52] U.S. Cl. ........................................ 75/243; 75/201; 75/203; 75/204
[58] Field of Search ................... 75/235, 201, 203, 204

[56] References Cited
U.S. PATENT DOCUMENTS
4,171,973 10/1979 Hara et al. .............................. 75/237

Primary Examiner—Brooks H. Hunt
Attorney, Agent, or Firm—Wenderoth, Lind & Ponack

[57] ABSTRACT

The invention relates to a diamond sintered body having a high wear resistance and making it possible to obtain a processed surface of high dimensional precision and beautiful finish as a wear resisting tool blank for use particularly in a wire drawing die, shaving die and the like, as a tool blank for use in a cutting tool for a workpiece consisting of nonferrous metals, plastics, ceramic, etc., and as a cutting tool blank for use in a glass cutter, synthetic building material cutting blade, etc., and method for producing the same, wherein a mixture comprising a diamond powder below 1μ and a powder below 1μ of one or more than two kinds of carbides, nitrides and borides of IVa, Va and VIa group metals of the periodic table, and further a powder of iron group metals is placed between a plurality of cemented carbide plates and then subjected to hot press sintering at a high temperature and high pressure under which diamond is stable thereby enabling to obtain a diamond sintered body having high properties suitable for the aforesaid uses.

8 Claims, 14 Drawing Figures

X 250

X 250

X 75

X 10000

DIAMOND SINTERED BODY AND THE METHOD FOR PRODUCING THE SAME

BACKGROUND OF THE INVENTION

A cutting tool material wherein a sintered body consisting of more than 70 vol % of diamond and a metal chiefly comprising Co as a bonding material is bonded onto a cemented carbide substrate is commercially available. The said tool blank is commonly used in a cutting tool for processing Al alloys containing a large amount of Si, Cu alloys, etc. despite the high price thereof.

The said tool blank is not only far better in respect to wear resistance than that of the conventional cemented carbide but also sufficiently tough against impact as compared with a tool blank produced from a single crystal natural diamond. The said cutting tool blank, however, has a disadvantage in that the processed surfaces of nonferrous metals and the like cut by said tool blank have greater roughness compared with those processed by the cutting tool of single crystal natural diamond, thereby rendering it impossible to obtain a beautifully finished surface like a mirror. Moreover, particularly when a small and thin workpiece, such as a part of a watch and the like, is processed, the said tool blank has a high cutting resistance, whereby the workpiece is liable to be deformed out of dimensional precision.

SUMMARY OF THE INVENTION

The invention relates to a diamond sintered body useful as a wear resisting tool blank for use particularly in a wire drawing die, shaving die and the like, as a tool blank for use in a cutting tool for a workpiece made of nonferrous metals, plastics, ceramic, etc., and as a cutting tool blank for use in a glass cutter, synthetic building material cutting blade, etc., and a method for producing the same, wherein a mixture comprisingg 50-95 vol % of a diamond powder below $1\mu$, the remainder consisting of a powder below $1\mu$ of one or more than two kinds of carbides, nitrides, borides of IVa, Va and VIa gorup metals of the periodic table and solid solutions thereof, and further a powder of iron group metals, is interposed between a plurality of cemented carbide plates, and then subjected to hot press sintering at a high temperature and high pressure under which diamond is stable thereby enabling to obtain a diamond sintered body having high wear resistance.

DETAILED DESCRIPTION OF THE INVENTION

The invention relates to an inexpensive diamond sintered body in the shape of a thin plate capable of replacing a natural diamond for industrial use, which is particularly suitable for a wire drawing die tool blank, a wear resisting member, and a cutting tool blank, and the method for producing the same.

At present, a cutting tool material for cutting nonferrous metals, plastics and ceramics wherein a sintered body consisting of more than 70 vol % of diamond and a metal chiefly comprising Co as a bonding material is bonded onto a cemented carbide substrate is commercially available. Despite its high price, the said tool material is welcomed in some circles as a cutting tool blank for processing Al alloys containing a large amount of Si and copper alloys.

The inventors of the present invention made careful studies on the properties of the aforesaid tool material. Cutting tests were practically conducted with cutting tool produced by making use of the said material. As a result, it was found that the cutting tool was featured by its superiority over the conventional cemented carbide tool in respect to wear resistance with greater toughness against impact compared with a tool made of a single crystal natural diamond.

It was found, however, that the processed surface of, for example, a nonferrous metal showed greater roughness compared with the surface machined by a cutting tool made of single crystal natural diamond. Thus, it was impossible to obtain a machined surface as beautifully finished as a mirror.

Moreover, when a small and thin workpiece, such as a part of a watch, was machined, the workpiece was liable to be deformed by high cutting resistance thereby rendering it impossible to sustain dimensional precision. Careful examinations revealed the following reasons.

The marketed diamond sintered body is composed of diamond crystals of $3-10\mu$, the diamond crystals being bonded to each other in a skeleton construction with metallic Co as a bonding material existing therebetween. The edge of the tool made of the sintered body shows convexities and concavities substantially the same as the size of the crystal particles, which is different from the sharp edges of the natural diamond cutting tool. This is one of the reasons why the beautifully finished surface is unobtainable by the marketed diamond sintered body cutting tool. Furthermore, the metallic Co bonding phase existing between the diamond particles is liable to adhere to the workpiece. This is another problem to be solved when a mirror like surface is required.

The marketed diamond sintered body available for use in a die consists of diamond particles of 50-60μ with its outer periphery concentrically encircled by a cemented carbide.

Figure 1A:
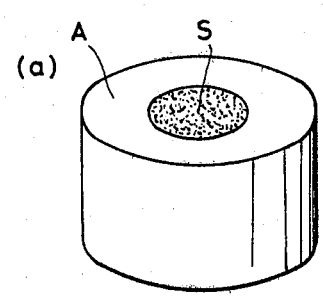
FIG. 1(a) is a perspective view showing the construction of the marketed diamond sintered body for use in a wire drawing die.
Figure 1B:
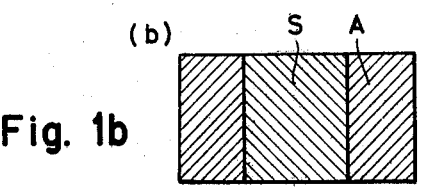
FIG. 1(b) is a sectional view of the same.

FIG. 1(a) and FIG. 1(b) show the construction of the said diamond sintered body for use in a wire drawing die, FIG. 1(a) being a perspective view, while FIG. 1(b) shows a sectional view of the same, where (S) shows the diamond sintered body which is integrated with the encircling ring (A) of WC-Co cemented carbide.

According to the Japanese Laying Open Gazette No. SHO-50-26746 which conceivably covers the art of the aforesaid marketed article, the strong compressive stress of the outer peripheral cemented carbide acting on the inner diamond sintered body helps to improve the properties of the wire drawing die. However, when the diamond is sintered under normal pressure, it transforms to graphite due to a high temperature. Therefore, an ultrahigh pressure high temperature apparatus is necessitated which is as expensive as in the case of synthesizing a diamond. According to the said Laying-Open Gazette, the encircling cemented carbide is also sintered in the same expensive ultrahigh pressure high temperature apparatus. As a result, the diamond sintered body for use in a wire drawing die commercially available at present is extravagently high-priced.

A diamond die made of single crystal natural diamond has been in use for a long time. The price (Y) of single crystal natural diamond is substantially represented by the formula of $Y=(AX+B)^2$ depending on the size thereof (X) (wherein A and B are constants). The price is very high when the size is large.

Conversely speaking, a small-sized single crystal natural diamond is relatively inexpensive. Single crystal natural diamond replaceable by a marketed diamond sintered body after processing into a wire drawing die is estimated at 1.2 mm and upward in bore size except a specific case. In many cases, it is said that the sintered diamond die has a longer life than the single crystal natural diamond die. If it is possible to provide small-sized diamond sintered bodies at low price, it will have a great industrial significance.

In recent years, the production of natural diamond has not been increased, the price showing a sharp uprise since the demand exceeds the supply. Great hopes are entertained of the said marketed diamond sintered body as a substitute for single crystal natural diamond. However, it is high-priced and is not yet capable of replacing natural diamond altogether though it displays distinguished merits when used in a die.

The marketed diamond sintered body for use in a wire drawing die comprises coarse diamond particles of 50-60μ sintered with a bonding material chiefly consisting of metallic Co.

Figure 2:
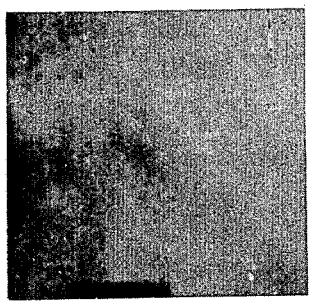
FIG. 2 is a photograph showing the state of the surface of a copper wire drawn by a natural diamond die.
Figure 3:
FIG. 3 is a photograph showing the state of the surface of a copper wire drawn by means of a marketed diamond sintered body.

The properties of the coarse-grained sintered body were examined by the inventors of the present invention by practically drawing a wire thereby. As a result, there were some problems to be solved though great improvement over the conventional cemented carbide wire drawing die had been made in wear resistance and some other respects. One of the problems is that scars are left on the surface of the drawn wire. FIGS. 2 and 3 show examples thereof. FIG. 2 shows the condition of the surface of a copper wire 0.5 mm in diameter drawn by use of a die made of single crystal natural diamond, while FIG. 3 shows that of the same wire drawn under the same condition by making use of the said marketed sintered body.

Figure 4:
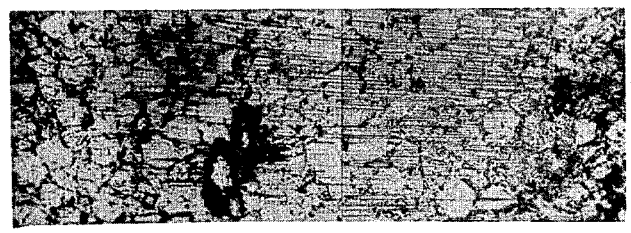
FIG. 4 is a photograph showing the inner face of a die after the wire drawing, in which a marketed diamond sintered body is used.

As is apparent from the comparison, the marketed sintered diamond die leaves a great deal of scars on the drawn wire. Examination of the inside of the used die revealed that part of the sintered diamond particles was broken and missing as shown by the photograph of FIG. 4, the scars being presumably caused when the metal bit into the said defective part of the die while being drawn.

Another shortcoming of the marketed sintered diamond consists in greatness of the friction coefficient between the wire to be drawn and the die compared with the case of a natural diamond die. The greatness of the friction coefficient is liable not only to cause a breakage of the wire but also to render the control of the wire diameter difficult. The greatness of the friction coefficient may be attributable to the following reasons. The bonding material chiefly consists of metallic Co which is liable to adhere to the wire to be drawn. Furthermore, since the wear resistance of the diamond particles is largely different from that of the bonding material, the bonding material is worn earlier than the diamond particles, concavities thus formed permitting the wire to be drawn to bite thereinto.

The inventors have made the present invention after careful studies on the method for developing a diamond sintered body capable of obviating the aforementioned disadvantages of the marketed diamond sintered body, having properties capable of entirely replacing a single crystal natural diamond, and producible at low cost.

To be more precise, the diamond sintered body conforming to the invention is characterized in that the diamond crystals are composed extremely fine particle below 1μ, and preferably below 0.5μ, the chief component of the bonding material being not a metallic phase but a powder below 1μ of carbides, nitrides and borides of IVa, Va or VIa group metals of the periodic table including a small amount of iron group metals as an auxiliary agent, a sintered body comprising such fine diamond particles making it possible to largely alleviate the surface scars of the drawn wire which were inevitable in case of the aforesaid marketed diamond sintered body. The bonding material for bonding the diamond particles chiefly consists of compounds having high hardness, wear resistance and adhesion, such as carbides, nitrides and borides of IVa, Va or VIa group metals of the periodic table, instead of simple metals. The compound is, for example, a carbide, such as WC, TiC or TaC, which is used as a principal wear resisting component of the cemented carbide. At present, such cemented carbide is for use in a cutting tool, wire drawing die, etc.

Since the bonding material of the diamond sintered body conforming to the invention chiefly comprises compounds having high wear resistsnce and adhesion with a small content of iron group metals, the wire drawing die made of the diamond sintered body conforming to the invention causes less adhesion of the wire to be drawn with less friction coefficient compared with die made of the marketed diamond sintered body.

Furthermore, the invention is greatly characterized by its shape. The diamond sintered body conforming to the invention is intended for replacing a single crystal natural diamond. A sintered body of substantially the predetermined shape of the currently used diamond can be produced particularly when it is for use in a wire drawing die.

Figure 5:
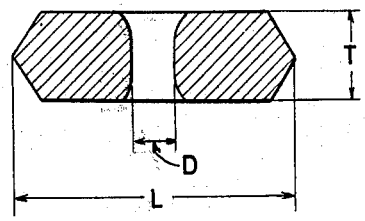
FIG. 5 is a diagram illustrating the shape and size of a natural diamond.

The size of a rough diamond for use in a die is as shown in FIG. 5 according to the International Diamond Association Standard (IDAS). The required effective side length (L) is greater than the effective thickness (T), and $T \geq 1.2D + 0.6$ (mm), $L \geq 1.5D + 1.4$ (mm). What is required is to produce a plate-like sintered body such as will satisfy the said standard.

The wire drawing die of a single crystal natural diamond produced at present has a hole diameter up to about 3 mm, the size of the sintered body required in this case being about 4 mm in thickness and about 6 mm in side length. In practice, the dies in which natural diamond is mostly used are those having a still smaller hole diameter.

The inventors of the present invention, after careful studies on the method for industrially producing a thin diamond sintered body in the shape of a plate, have found that such a thin diamond sintered body is readily producible by interposing a powder material of the sintered body including a fine powder of diamond between cemented carbide plates of high rigidity and subjecting same to high pressure and temperature.

The cemented carbide in the aforesaid case is chiefly composed of WC, (Mo,W)C, TiC, TaC, etc. bonded by a metal, WC, (Mo,W)C being particularly preferred for the high deformation resistance thereof. A green compact of a sandwich structure with a layer 3 of powder material containing a fine diamond powder interposed between cemented carbide thin plates 1, 2 (FIGS. 6 and 7) is placed in an ultrahigh pressure high temperature apparatus. The pressure is applied by a pair of pistons 4, 5.

Thus, it is preferable that the green compact of the sandwich structure is disposed normally to the pistons. As is apparent from FIG. 8, a plurality of green compacts may be placed in the apparatus simultaneously. Since heating is effected by applying a heavy current to a graphite heater 10 through the pistons 4, 5, a temperature distribution arises in the vertical direction. A plurality of green compacts may be placed simultaneously within the scope of this tolerance. Referring to the drawings, the numerals 6 and 7 designate cylinders, 8 and 9 designating pressure mediums, 11 and 12 designating partition members.

According to the invention, the powder material of the diamond sintered body comprises a mixture of fine powder of diamond and fine powder of carbides, nitrides and borides of IVa, Va or VIa group metals of the periodic table which are principal components of the bonding material. A fine powder of iron group metals may be added as an auxiliary agent.

Figure 6:
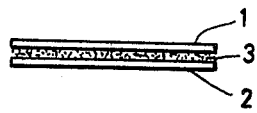
FIGS. 6 to 8 are typical diagrams describing the method conforming to the invention.

In the former case, the green compacts are disposed as shown in FIG. 6 and heated after pressurized in the ultrahigh pressure apparatus. Then, an eutectic liquid phase appears on the upper and lower cemented carbide thin plates 1, 2, a small amount of said solution phase infiltrating into the layer of the powder material containing diamond so as to act as an auxiliary agent.

Figure 7:

In the latter case, a predetermined amount of iron group metal powder as an auxiliary agent has been preliminarily added to the powder material, and no infiltration of the liquid phase from the upper and lower cemented carbide thin plates is necessitated in this case. In order to stabilize the composition of the bonding material in the diamond sintered body, it is preferable to adopt the latter method wherein partition members 11, 12 for precluding displacement of the liquid phase appearing in the course of sintering between the powder mixture 3 containing diamond and the upper and lower cemented carbide thin plates 1, 2, as shown in FIG. 7. The partition member may be selected from the materials unfusible at the high temperature and pressure to which the sintered body is exposed, for example, metals of high fusing point, such as Ti, Zr, Hf, Ta, Nb, Cr, Mo, W, Pt, etc. or compounds of high fusing point, such as TiN, ZrN, HfN, BN, $Al_2O_3$, etc. In view of its end, the partition member requires no great thickness, a thickness less than 0.5 mm being sufficient. The aforesaid metal foil may be used as a partition member, or the cemented carbide thin plate may be plated. In case of use of a compound, it may be applied to the cemented carbide thin plate in the state of fine powder, or by any known art, for example, the chemical vapor deposition method (abbreviated as CVD).

The diamond sintered body conforming to the invention is characterized in that the diamond crystal particles in the sintered body consist of ultrafine particles below $1\mu$ (preferably below $0.5\mu$).

According to the experiments by the inventors of the present invention, however, such ultrafine grain diamond sintered body is not obtainable by the method of simply mixing a diamond powder below $1\mu$ as the powder material and iron group metal powder as a bonding material, or by the method of causing a liquid phase containing iron group metals to infiltrate into the diamond powder from the surrounding cemented carbide during the sintering process.

In such a case, the iron group metals, such as Co, Fe, Ni, etc., act as a solvent of diamond thereby inducing the phenomenon of dissolution and precipitation of diamond into the solvent at the high temperature and high pressure under which diamond is stable.

In case of using a diamond powder below $3\mu$, and particularly $1\mu$, the abnormal growth of diamond crystals arises, a sintered body consisting of uniformly fine crystals being unobtainable as a result.

On careful studies of the method for producing a sintered body of fine crystals below $1\mu$, the inventors of the present invention have found that the grain growth of diamond can be controlled even in the state of coexistence with an iron group metal liquid if the diamond powder is mixed with a fine powder of carbide, nitride, and boride of IVa group metals (Ti, Zr, Hf), Va group metals (V, Nb, Ta) and VIa group metals (Cr, Mo, W) of the periodic table.

It is presumable that the grain growth is controlled by the existence of the compound particles between the fine diamond crystal particles which act as impurities, or the grain growth is controlled by the dissolution of part of the compounds into the iron group metal liquid and the precipitation thereof as carbides on the surface of the diamond crystals.

In order to have the aforesaid action, it is necessary that the compound particles are interposed between the fine diamond crystal particles. Thus, the compounds should be pulverized to a granularity same as or below that of the diamond crystals and mixed with the diamond crystal powder uniformly.

The experiments show that, among the compounds, carbides of IVa group, Va group and VIa group metals have the greatest effect of controlling the grain growth. When viewed from the performance of a cutting tool, it is necessary that the compounds have high strength and wear resistance since they are retained in the sintered body as the bonding material of the diamond crystals together with the iron group metals. Thus, the use of carbides will enable to obtain a sintered body having a higher strength and wear resistance.

As a diamond powder for use in the sintered body conforming to the invention, both synthetic diamond and natural diamond are suitable insofar as the diamond is micronized less than $1\mu$, and preferably less than $0.5\mu$. A mixture comprising the diamond powder, one or more than two kinds of said compound powders, and a powder of iron group metals such as Fe, Co, Ni is uniformly milled by means of a ball mill or the like.

The iron group metals may be caused to permeate at the time of sintering instead of preliminary mixing.

As described in the prior application by the inventors, Patent Application No. SHO-52-51381, the pot and balls may be produced by means of a sintered body comprising iron group metals and compounds, such as carbides and the like.

Thus, a fine powder, which comes out of the pot and balls, of sintered body of iron group metals and compounds, such as carbides and the like, is mixed with the diamond powder while it is milled in the ball mill.

Figure 8:
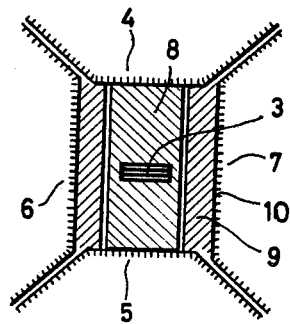

The powder mixture thus prepared is placed directly between cemented carbide thin plates as shown in FIG. 6 when the iron group metals are not preliminarily mixed, or placed between said thin plates with interposition of partition members as shown in FIG. 7 when a required amount of iron group metals is preliminarily mixed, green compacts of such sandwich structure being placed in a single layer or multiple layers in the ultrahigh pressure high temperature apparatus as shown in FIG. 8.

In case of the arrangement as shown in FIG. 6, an eutectic liquid phase arises on the upper and lower cemented carbide thin plates 1, 2 when heated after application of pressure, said liquid phase infiltrating into the powder mixture 3 of diamond, carbides and the like.

In case of the arrangement of FIG. 7, sintering is effected at a higher temperature than the level at which a eutectic liquid phase appears between the iron groups metals used in the powder mixture containing diamond and the compounds, such as carbides and the like.

For example, when TiC is used as a compound and Co as an iron group metal, a liquid phase arises at about 1260° C. under normal pressure. Under high pressure, the eutectic temperature will be higher by scores of degrees C.

In this case, therefore, sintering is effected at a temperature higher than 1300° C.

In this invention, however, there is also a upper limit to a sintering temperature. This temperature should not be higher than 200° C. from eutectic temperature, when grain growth of diamond becomes remarkable.

Figure 13:
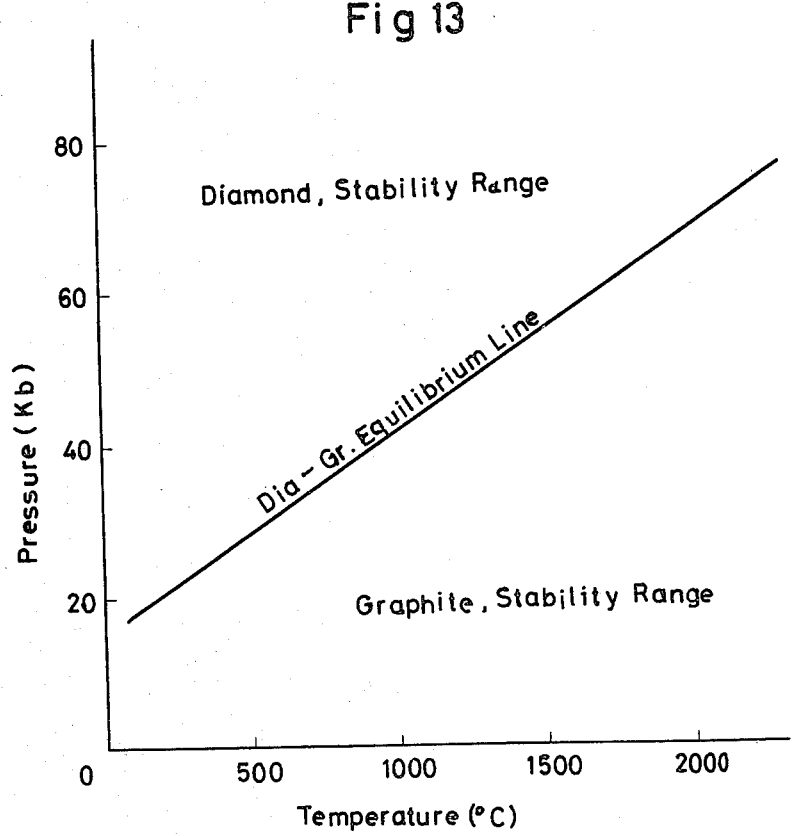
FIG. 13 is a diagram related to the production conditions of the diamond sintered body conforming to the invention, showing the diamond stability range on the temperature and pressure phase chart.

In all the cases, the conditions pressure and temperature under which sintering is effected should be within the stability range of diamond as shown in FIG. 13, otherwise diamond will transform into graphite in the course of sintering.

Thus, a sintered body rigidly integrated in a sandwich structure is obtainable when the temperature is lowered and the pressure is released.

The upper and lower surface are ground by means, of for example, a diamond grinder.

Minor concavities of the cemented carbide and the partition member need not be removed completely, since a high degree of parallel between the upper and lower surfaces of a sintered body very much facilitates the production of a die.

In reverse, a relatively small residual of the cemented carbide is almost harmless.

Figure 9:
FIG. 9 is a perspective view of a diamond sintered body obtained according to the invention.

The diamond sintered body of which the greater parts of the upper and lower surfaces are in parallel is cut by a diamond cutter or laser. FIG. 9 is a perspective view of a diamond sintered body thus obtained.

The principal use of the diamond sintered body conforming to the invention is a replacement of the natural single crystal as described hereinbefore. Though the single crystal is susceptible to cleavage and breakage with relatively low strength, the sintered body conforming to the invention has an advantage in respect of strength since it consists of fine crystals since it has been developed as a substitute for fragile single crystals, it necessitates no reinforcement as described in the Laying-Open Gazette No. SHO-50-26746.

If a greater strength is required, the dimensions of the sintered body may be increased longitudinally and transversely, or the sintered body may be formed into the shape of a triangle.

The diamond sintered body conforming to the invention contains diamond within the scope of 95-50 vol %. In case the diamond content exceeds 95%, the grain growth of diamond can not be controlled with effect during the sintering process since the amount of the interposed compounds is not sufficient. If the diamond content is less than 50 vol % of the sintered body, the wear resistance is reduced and the properties equal to those of natural diamond are no longer obtainable.

The ratio of the compounds, such as carbides and the like to the iron group metals acting as bonding agents of diamond in the sintered body can not be readily determined.

However, the amount should be at least such that the compounds are permitted to remain as solids at the time of sintering. For example, in case WC is used as a compound and Co as a bonding metal, the quantitative ratio of WC to Co should be such that the former is contained in more than about 50% by weight. When a diamond sintered body conforming to the present invention is used as a wire drawing die, the greater the diamond content in the sintered body, the higher is the wear resistance.

If the diamond content is 95-70%, a wire drawing die having a longer life than a natural diamond die is obtainable.

In this case, the performance will be further improved if a carbide containing Mo, and preferably (Mo, W)C having the same crystal structure at that of WC, is used as the principal component of the diamond bonding material. The reason why the performance of the wire drawing die is improved when a carbide containing Mo is used as a bonding material may be attributable to the fact that Mo is less liable to adhere to the workpiece compared with other compounds, such as WC and the like. This is presumably due to the properties of oxides produced on the friction surface. To be more precise, $MoO_3$ which oxidizes Mo carbide is produced.

The said oxide, having a layer-like structure, is a self-lubricator belonging to the group having the lowest friction coefficient among the oxides. The sintered body conforming to the invention and the method for producing the same have been described hereinbefore with reference to a tool blank for use in a thin wire drawing die in which the effect of the invention is best displayed.

The invention has a great effect also as a wear resisting tool blank for use in a thicker wire drawing die, a shaving die and the like, as well as a cutting tool blank of a glass cutter and a synthetic building material cutting blade. In other words, it is useful where the single crystal diamond tool is used at present, for example, a wire drawing die in which a particularly beautifully finished surface is required, and Al alloys and Cu alloys which are required to be finished with mirror-like surfaces.

The invention will be described in more detail in reference to the following examples.

EXAMPLE I

A powder of $0.5\mu$ of synthetic diamond and a powder of WC and Co were milled by means of a pot and balls made of a WC-Co cemented carbide. The powder mixture thus produced was of the following composition.

TABLE 1

| No | Volume % Diamond | WC | Co | Sintered Body Vickers Hardness |
|----|------------------|-----|-----|-------------------------------|
| A  | 96               | 2   | 2   | Grain Growth                  |
| B  | 90               | 3   | 7   | Grain Growth                  |
| C  | 90               | 5   | 5   | 8,000                         |
| D  | 80               | 15  | 5   | 7,200                         |
| E  | 50               | 45  | 5   | 5,300                         |
| F  | 25               | 70  | 5   | 2,100                         |

No. C to E represent the sintered bodies conforming to the invention.

The powder mixtures were stuffed into containers made of Ta and placed in an ultrahigh pressure apparatus. After the pressure was raised to 55 Kb, sintering was effected at 1450° C. for 30 minutes. Examination of the microstructures of the sintered bodies thus obtained showed that no sintered bodies of uniform microstructure were obtainable from the samples No. A and No. B, coarse diamond crystals of about $300\mu$ being produced.

The samples No. C to No. F were fine crystal sintered bodies containing diamond below $1\mu$ and WC below $1\mu$, respectively.

The vickers hardness of the respective sintered bodies is shown in Table 1.

A tip for use in a cutting tool was produced by cutting the sintered body of No. C, and a cutting test was conducted on an Al alloy.

The workpiece was an Al alloy round bar having a diameter of 60 mm.

It was cut under the condition of cutting speed 250 m/min, feed 0.02 mm/rev, cutting depth 0.7 mm. A finished face almost as beautiful as the mirror was obtained, which was substantially same as the surface finished by a natural diamond tool under the same conditions.

EXAMPLE 2

A powder mixture of the composition of No. C in Example 1 was stuffed into a container made of Ta 5 mm in inside diameter, 5 mm in depth and $50\mu$ in thickness, and then fitted into a ring 15 mm in outside diameter, 5.2 mm in inside diameter and 5 mm in height made of preliminarily sintered WC-10% Co alloy.

The compound sample thus prepared was placed in an ultrahigh pressure apparatus and sintered under the same conditions as in Example 1. The sintered body thus obtained was a compound body with a diamond sintered body brought into contact with the inner periphery of a WC-10% Co cemented carbide ring.

The Ta container $50\mu$ in thickness remained on the interface, part of which had turned into TaC through reaction with diamond or cemented carbide. The existence of the interface apparently obviated infiltration of Co liquid phase from the cemented carbide ring during the sintering process thereby enabling a diamond sintered body of a very fine microstructure below $1\mu$.

The sintered body was mounted on a stainless steel ring in the same manner as when a natural diamond die is produced.

A wire drawing die was produced by drilling a hole through the diamond sintered body.

The die thus produced was used to draw a stainless steel wire 1 mm in diameter for which a natural diamond die was conventionally used. The life of the diamond sintered body die was three times as long as that of the natural diamond die, and the surface of the drawn wire was no less smooth than the ease of the natural diamond die.

EXAMPLE 3

A powder mixture of the composition as shown in Table 2 was produced by making use of a diamond powder below $1\mu$.

TABLE 2

| No. | Diamond Vol. % | Bonding Material & Vol. % Compound | Iron Group Metal |
|-----|----------------|------------------------------------|------------------|
| G   | 80             | 15 TaC                             | 5 Co             |
| H   | 80             | 15 TiC                             | 5 Co             |
| I   | 80             | 15 TiB$_2$                         | 5 Ni             |
| J   | 80             | 15 ZrN                             | 5 Ni             |
| K   | 80             | 15 WC                              | 5 Ni             |
| L   | 80             | 15 (Mo$_7$W$_3$)C                  | 2.5 Co—2.5 Ni    |

Sintered bodies were obtained under the completely same sintering conditions as in Example 1. All the sintered bodies thus obtained comprised fine crystals below $0.5\mu$ formed into a skeleton structure.

However, the sintered bodies, No. I and J, had stratiform cracks extending thereon, and the strength thereof was inferior to that of the other samples.

EXAMPLE 4

A pair of thin plates 1, 2 20 mm in diameter and 1.5 mm in thickness of a composition of WC-10% Co were prepared. A powder mixture comprising 90 vol % of synthetic diamond powder below $1\mu$ (average granularity $0.3\mu$) for use in lapping and 10 vol % of WC powder below $1\mu$ was interposed between the thin plates 1, 2 in the form of a sandwich so that the interposed powder layer 3 has a thickness of 1.7 mm as shown in FIG. 6.

Figure 11:
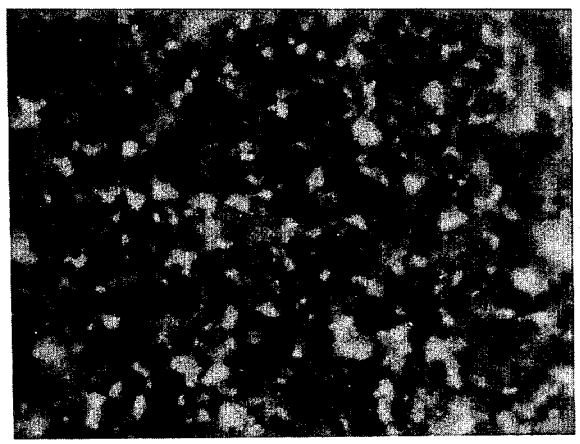
FIG. 11 is a photograph of a scanning electron microscope showing the microstructure of diamond sintered body according to the invention. The gray or black part is diamond particles and the white part is WC particles.
Figure 10:
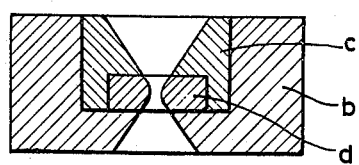
FIG. 10 is a sectional view of wire drawing dies using a diamond sintered body according to the invention; wherein b is a case made of stainless steel, c is sintered metal mount and d is diamond sintered body.
Figure 12:
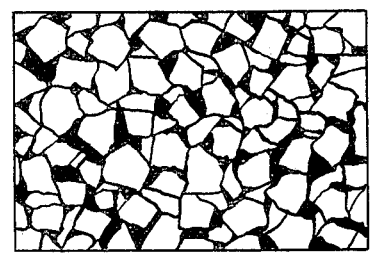
FIG. 12 is a type view of microstructure of diamond sintered body according to the invention shown in FIG. 11. White particles is diamond and black particles is WC.

The sample thus prepared was placed in an ultrahigh pressure high temperature apparatus called a girdle apparatus as shown in FIG. 8 in such manner that the sample is normal to pistons 4, 5. Sintering was effected under a pressure of 55 Kb and at a temperature of 1400° C. for 10 minutes. The sintered body thus obtained was free from warp macroscopically. The upper and lower surfaces of the sintered body were subjected to plane grinding by means of a diamond grinder until the diamond layer was exposed to obtain a diamond sintered body 1.2 mm in thickness. The diamond sintered body thus obtained was lap-finished in part and examined under an electron microscope. The examination showed that the diamond sintered body was completely compact, its crystal granularity being about $0.3\mu$, as shown in the photograph of FIG. 11 and the typical drawing of FIG. 12. The diamond sintered body was cut 2.5 mm square by means of YAG laser (FIG. 9) to produce a wire drawing die capable of drawing a 0.5 mm wire as shown in FIG. 10. This die, when used for drawing SUS304, showed that its life was twice as long as that of the conventional single crystal die. The result showed that this die was advantageous to wire drawers in respect of cost, too.

EXAMPLE 5

A mixture comprising a diamond powder the same as was used in Example 4 and a fine powder of $(Mo_9, W_1)C$ pulverized below $1\mu$ l in the ratio of 90% to 10% was sandwiched in between a pair of thin plates 20 mm in diameter and 2 mm in thickness made of an alloy of $(Mo_9, W_1)C$-10 wt % Co-10 wt % Ni in such manner that the powder mixture will have a thickness of 1.5 mm. The sample thus prepared was sintered under a pressure of 52 Kb and at a temperature of 1250° C. for ten minutes in the same ultrahigh pressure apparatus as in Example 4 to obtain a diamond sintered body sandwiched between (Mo, W)C base alloy. The (Mo, W)C base alloy on one side was completely removed, while that on the other side was ground until it was 0.2 mm in thickness thereby enabling to obtain a plate-like diamond sintered body 1.0 mm in thickness having a 0.2 mm layer of (Mo, W)C base alloy bonded to one side thereof. It was cut into pieces 2.5 mm square by means of laser, and the same die as in Example 4 was produced by making use of one of the pieces. As a result of a stainless steel wire drawing test, the said die was found to have higher properties than that of the die obtained according to Example 4, and enable to draw wire about 3.5 times as much as in the case of a natural diamond signal crystal die.

EXAMPLE 6

A diamond powder below $1\mu$ was subjected to wet ball milling for 24 hours with alcohol as a solvent and by making use of a millpot lined with $(Mo_7, W_3)C$-10 wt % Co-5 wt % Ni alloy and balls made of the same alloy. Subsequently the pulverized powder was reclaimed by evaporating the alcohol. On analysis, it was found that the powder was mixed with (Mo, W)C, Co and Ni from the pot and balls in 15 vol % of the whole powder.

Independently, there were prepared a pair of disks 20 mm in diameter and 2 mm in thickness made of $(Mo_7, W_3)C$-5 wt % Co-5 wt % Ni alloy. A Ta foil 0.1 mm in thickness and 20 mm in diameter was placed on the inside of each disk, and then the aforesaid powder was placed between the Ta foils so that the powder layer was 1.5 mm in thickness. The sample thus prepared was sintered under a pressure of 52 Kb and a temperature of 1300° C. for 10 minutes in the same apparatus as in Example 4 to obtain a sintered body comprising a diamond sintered body part about 1 mm in thickness with a 0.1 mm partition member and a $(Mo_7, W_3)C$-5% Co-5% Ni alloy thin plate bonded to the upper and lower face, respectively.

The upper and lower $(Mo_7, W_3)C$ alloy parts were substantially completely ground away. Then, the disk-shaped diamond sintered body having a Ta layer about 0.1 mm in thickness on each face thereof was cut by laser into sintered bodies 2 mm square and 1.2 mm in thickness. One of the sintered bodies was fixed to a stainless steel ring by hot pressing at about 750° C. by making use of a mounting powder comprising silver blazing alloy powder mixed with iron powder, and a die having a hole diameter of $0.18\phi$ was produced by the same method as in the case of a natural diamond die. For comparison, dies of the same hole diameter were produced by making use of a diamond sintered body for use in a die in which marketed diamond crystals 50–60$\mu$ are bonded by Co, and by making use of natural diamond single crystals. Cu wire was drawn at a speed of 300 m/min by means of the three kinds of dies to measure the friction coefficient. In the case of the sintered body according to the invention, the value was substantially same as in the case of the natural diamond single crystal die, whilst it was about 1.5 times as high in the case of the marketed diamond sintered body.

EXAMPLE 7

Thin plates made of WC-10% Co alloy same as in Example 4 were prepared. Furthermore, a fine powder of natural diamond below $1\mu$ was mixed with compounds and metallic Co in compositions as shown in Table 3.

TABLE 3

| No. | Fine powder of Natural Diamond | TiC | TaC | TiN | HfB$_2$ | Co |
|---|---|---|---|---|---|---|
| M | 85 | 10 | | | | 5 |
| N | 70 | | 25 | | | 5 |
| O | 60 | | | 35 | | 5 |
| P | 80 | | | | 15 | 5 |

On the inside of a pair of WC-10 Co disks were placed 0.1 mm Mo foils as partition members, and then a powder mixture of the respective composition in Table 3 was placed therebetween to a thickness of about 1.5 mm to obtain a sintered body by the same method as in Example 4. All the sintered bodies thus obtained were rigid with their diamond crystal granularity below $1\mu$. The sample No. N in Table 3 was selected from these sintered bodies. After grinding away the upper and lower cemented carbide, the sintered body was cut by laser into pieces 3 mm$\times$2 mm in side lengths and 1 mm in thickness. One of the pieces was welded with silver blazing alloy to a steel shank to produce a bite for use in a cutting tool in the same manner as in the case of a natural diamond single crystal bite. A bronze column was cut by making use of this bite, and the finished surface was as beautiful as that finished by a natural diamond bite.

We claim:

1. A diamond sintered body comprising 50–95 vol % of diamond below $1\mu$, the remainder being a bonding material comprising carbides, nitrides and borides of IVa, Va or VIa group metals of the periodic table, solid solutions or mixture crystals thereof below $1\mu$, and iron group metals.

2. A diamond sintered body as defined in claim 1 characterized in that the bonding material comprises carbides of IVa, Va or VIa group metals of the periodic table and iron group metals, the carbide content in the ratio of carbides to iron group metals being greater than that corresponding to eutectic compositions.

3. A diamond sintered body as defined in claim 1 characterized in that the carbide in the bonding material is WC.

4. A diamond sintered body as defined in claim 1 characterized in that the carbides in the bonding material contain Mo.

5. A diamond sintered body as defined in claim 1 characterized in that the upper and lower surfaces of the sintered body are formed in the shape of plates substantially parallel to each other.

6. A diamond sintered body defined in claim 1 wherein the diamond sintered body is a tool blank for use in a wire drawing die.

7. A method for producing a diamond sintered body characterized in that a mixture of a diamond powder below 1μ and a powder below 1μ of one or more than two kinds of carbides, nitrides and borides of IVa, Va or VIa group metals of the periodic table and the solid solutions thereof, and a mixture in which a powder of iron group metals is further added, or a mixture of alloy powders of the said compounds and the iron group metals preliminarily alloyed are produced, said mixture being interposed between a plurality of cemented carbide plates directly or with the interposition of partition members for precluding the displacement of a liquid phase in the course of sintering, the diamond containing mixture being sintered by hot pressing it under the condition of high temperature and high pressure in which diamond is stable, thereafter reducing temperature and removing pressure thus taking out sintered body, subsequently part or whole of the cemented carbide plates being removed substantially in parallel.

8. A method for producing a diamond sintered body as defined in claim 7, characterized in that a carbide powder of IVa, Va and VIa group metals of the periodic table and iron group metals are used as a bonding material forming powder, a mixture of diamond powder and the said bonding material powder being sintered at a high temperature and high pressure under which diamond is stable and at a temperature above the level where eutectic arises between the carbides and the iron group metals in the bonding material, the temperature not being higher than 200° C. from the eutectic temperature, thereby rendering it possible to control the grain growth of diamond.

* * * * *